(12) United States Patent
Liu et al.

(10) Patent No.: US 10,950,983 B2
(45) Date of Patent: Mar. 16, 2021

(54) CONNECTOR

(71) Applicants: Tyco Electronics (Shanghai) Co. Ltd., Shanghai (CN); TE Connectivity Corporation, Berwyn, PA (US)

(72) Inventors: WenYu Liu, Shanghai (CN); Hongqiang Han, Shanghai (CN); Chenxi Wang, Shanghai (CN); Jiwang Jin, Shanghai (CN); Nikhil Shankar, Salt Lake City, UT (US)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/364,328

(22) Filed: Mar. 26, 2019

(65) Prior Publication Data

US 2019/0296493 A1    Sep. 26, 2019

(30) Foreign Application Priority Data

Mar. 26, 2018 (CN) .......................... 201810252720.5

(51) Int. Cl.
| | |
|---|---|
| *H01R 13/516* | (2006.01) |
| *H01R 13/659* | (2011.01) |
| *H01R 13/717* | (2006.01) |
| *G02B 6/42* | (2006.01) |
| *F21V 8/00* | (2006.01) |

(52) U.S. Cl.
CPC ......... *H01R 13/659* (2013.01); *G02B 6/0001* (2013.01); *G02B 6/4292* (2013.01); *H01R 13/516* (2013.01); *H01R 13/7172* (2013.01)

(58) Field of Classification Search
CPC .............. H01R 13/659; H01R 13/7172; H01R 13/516; G02B 6/0001; G02B 6/4292
See application file for complete search history.

(56) References Cited

U.S. PATENT DOCUMENTS

| | | | |
|---|---|---|---|
| 7,249,966 B2 | 7/2007 | Long | |
| 7,421,184 B2* | 9/2008 | Long | G02B 6/0001 385/146 |
| 7,621,773 B2* | 11/2009 | Bright | G02B 6/0008 439/490 |
| 8,684,765 B2* | 4/2014 | Shirk | H01R 13/7172 439/490 |
| 9,608,377 B1* | 3/2017 | Phillips | H01R 13/7175 |
| 9,893,472 B1* | 2/2018 | Chen | H01R 13/6586 |
| 2001/0039140 A1 | 11/2001 | Fasold et al. | |
| 2003/0002824 A1* | 1/2003 | Chan | G02B 6/4277 385/92 |
| 2005/0254772 A1* | 11/2005 | Long | G02B 6/0008 385/146 |
| 2007/0253168 A1* | 11/2007 | Miller | H01R 13/7172 361/719 |
| 2010/0111476 A1 | 5/2010 | Shirk et al. | |

(Continued)

FOREIGN PATENT DOCUMENTS

| | | |
|---|---|---|
| CN | 1316805 A | 10/2001 |
| CN | 105093391 A | 11/2015 |

*Primary Examiner* — Truc T Nguyen
(74) *Attorney, Agent, or Firm* — Barley Snyder

(57) ABSTRACT

A connector comprises a cage and a light pipe. The cage has a top wall, a bottom wall, and a pair of side walls between the top wall and the bottom wall. The light pipe is mounted on an outer surface of at least one of the pair of side walls.

20 Claims, 4 Drawing Sheets

(56) References Cited

U.S. PATENT DOCUMENTS

2011/0262074 A1* 10/2011 Shirk .................. G02B 6/3897
                                                              385/52
2016/0308313 A1* 10/2016 Yang ................. H01R 13/6587
2017/0214170 A1*  7/2017 Su ............................ G02B 6/42

* cited by examiner

CONNECTOR

CROSS-REFERENCE TO RELATED APPLICATION

This application claims the benefit of the filing date under 35 U.S.C. § 119(a)-(d) of Chinese Patent Application No. 201810252720.5, filed on Mar. 26, 2018.

FIELD OF THE INVENTION

The present invention relates to a connector and, more particularly, to a connector having a radiator.

BACKGROUND

A connector generally comprises a metal cage, such as a steel cage, and a contact module disposed in the metal cage. The contact module generally comprises a contact adapted to electrically contact a mating connector inserted into the connector. As transmission speeds of connectors increase, a heat generated by the connector increases. As a result, it is necessary to install a radiator on the top wall of the metal cage of the connector to improve the heat dissipation performance of the connector.

In order to make it easy for a user to observe the working state of the connector, it is often necessary to provide light pipes on the connector, which transmit a light from an indicator on a circuit board to the front side of the connector. The user may thus judge the working state of the connector according to the light of the indicator. Due to the limited space of the connector, these light pipes are usually disposed in a gap between fins of the radiators, which affects the ventilation performance of the radiators and greatly reduces the heat dissipation performance of the connector.

SUMMARY

A connector comprises a cage and a light pipe. The cage has a top wall, a bottom wall, and a pair of side walls between the top wall and the bottom wall. The light pipe is mounted on an outer surface of at least one of the pair of side walls.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
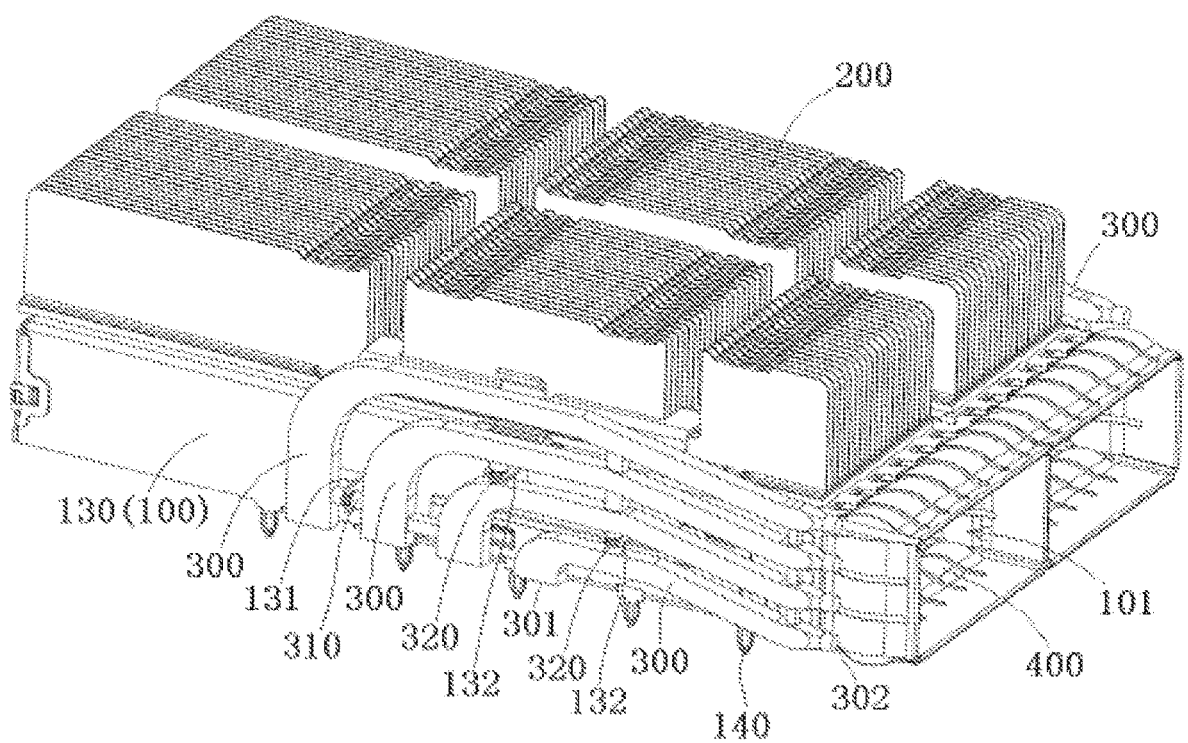
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
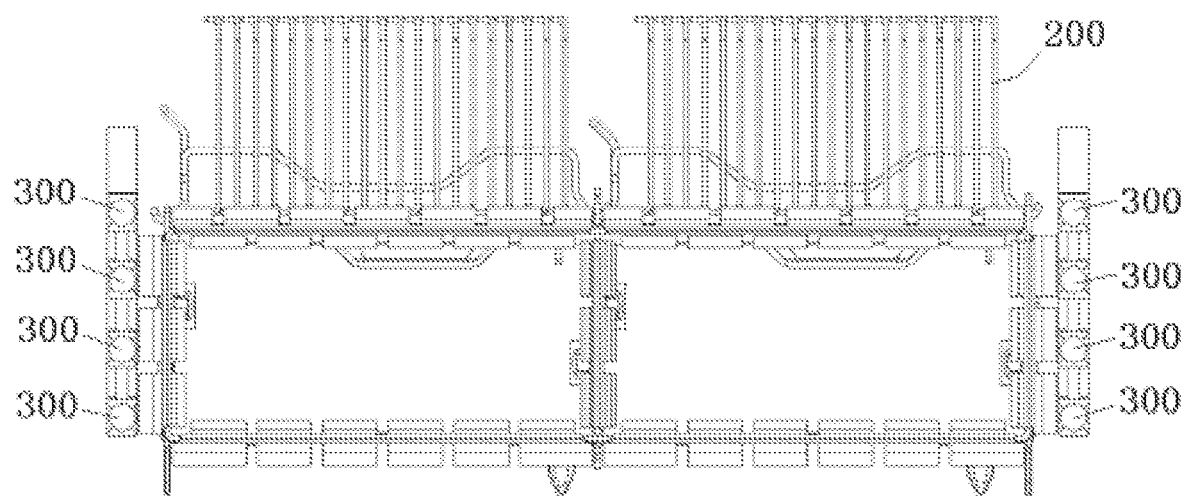
FIG. 2 is a front view of the connector.

A connector according to an embodiment, as shown in FIGS. 1 and 2, comprises a cage 100 and a radiator 200. The cage 100 has a top wall, a bottom wall, and a pair of side walls 130 between the top wall and the bottom wall. The radiator 200 is mounted on the top wall of the cage 100.

At least one light pipe 300, as shown in FIGS. 1 and 2, is mounted on an outer surface of at least one side wall 130 of the cage 100. In the embodiment shown in FIGS. 1 and 2, there are four light pipes 300 mounted on the outer surface of each side wall 130 of the cage 100. The four light pipes 300 are connected with each other to form a light guidance assembly. In other embodiments, there may be mounted one, two, three, five or more light pipes 300 on the outer surface of each side wall 130 of the cage 100. The light pipes 300 are mounted on the side wall 130 of the cage 100, instead of being mounted in gaps between fins of the radiator 200. Thereby, the ventilation performance of the radiator 200 will not be affected, and the heat dissipation performance of the connector is improved.

Figure 4:
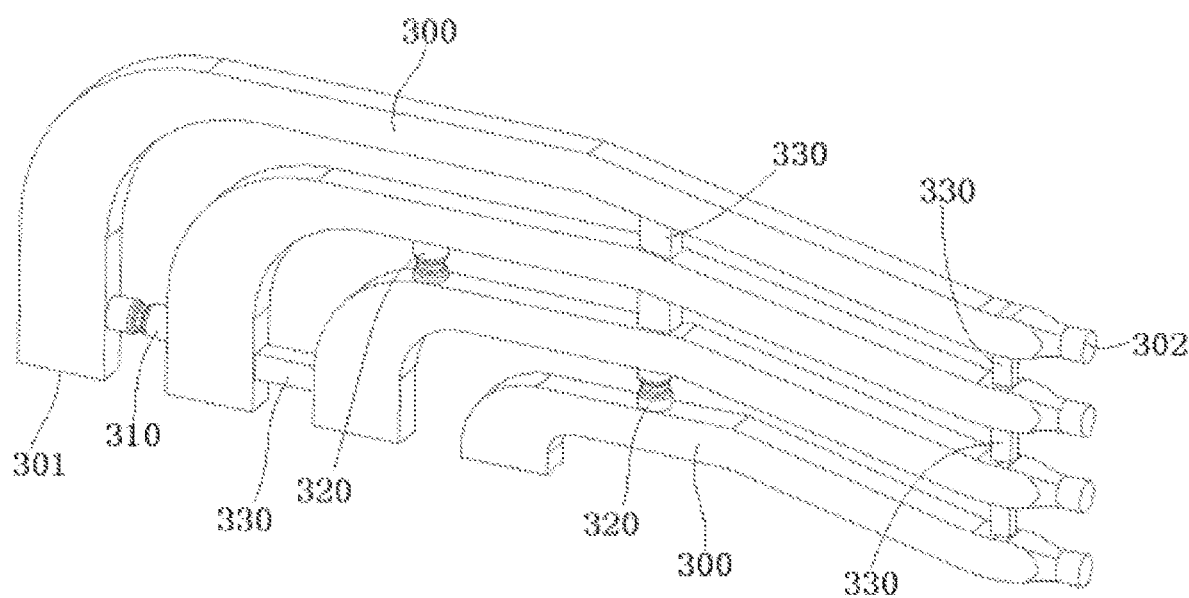
FIG. 4 is a perspective view of a plurality of light pipes of the connector.

As shown in FIGS. 1, 2, and 4, a plurality of light pipes 300, for example, four light pipes, on each side wall 130 are fixed to an outer surface of the side wall 130 of the cage 100 by a locking structure formed on the side wall 130 and the light pipes 300. The plurality of light pipes 300 mounted on the outer surface of each side wall 130 of the cage 100 are arranged in sequence in a vertical plane and separated from each other. Two adjacent light pipes 300 on each side wall 130 are connected to each other.

The locking structure comprises a first locking structure 310, 131 configured to position and fix the plurality of light pipes 300 in a vertical direction and a second locking structure 320, 132 configured to position and fix the plurality of light pipes 300 in a horizontal direction.

As shown in FIGS. 1 and 3-6, the first locking structure 310, 131 comprises a first connection bar 310 and a first clasp 131. The first connection bar 310 extends in the horizontal direction and is constructed to connect two adjacent light pipes 300. The first clasp 131 has a first C-shaped slot 131*b* into which the first connection bar 310 is adapted to be locked. The first C-shaped slot 131*b* is adapted to hold the first connection bar 310.

Figure 5:
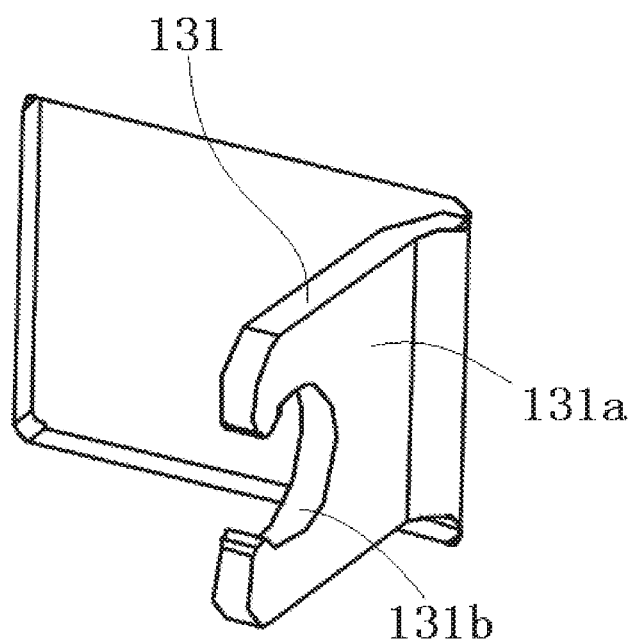
FIG. 5 is a perspective view of a first clasp of the connector.
Figure 6:
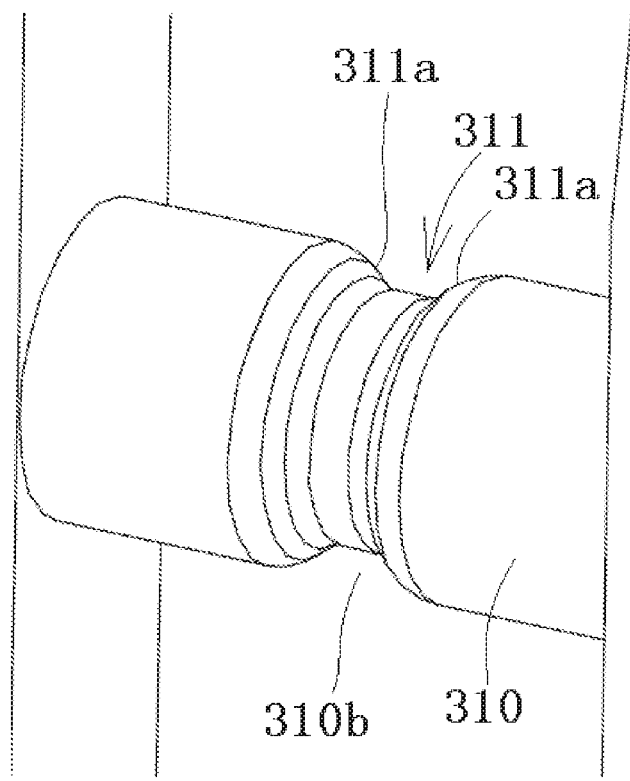
FIG. 6 is a perspective view of a first connection bar of the connector.

As shown in FIGS. 5 and 6, a circular first groove 311 is formed on the first connection bar 310 to form a first neck 310*b* on the first connection bar 310. The first neck 310*b* is adapted to be locked into the first C-shaped slot 131*b*. The first C-shaped slot 131*b* is adapted to hold the first neck 310*b*. The first groove 311 has a cross section with a horn shape gradually expanding outwards, and two slope side surfaces 311*a* of the first groove 311 are mated with two inner side edges of the first C-shaped slot 131*b* to guide the first neck 310*b* into the first C-shaped slot 131*b* and position the first neck 310*b* in the first C-shaped slot 131*b*. The first clasp 131 has a first plate body 131a located in a plane perpendicular to the outer surface of the side wall 130, and the first C-shaped slot 131b is formed in the first plate body 131a.

As shown in FIGS. 1, 3, 4, 7, and 8, the second locking structure 320, 132 comprises a second connection bar 320 and a second clasp 132. The second connection bar 320 extends in the vertical direction and is constructed to connect two adjacent light pipes 300. The second clasp 132 is formed with a second C-shaped slot 132b into which the second connection bar 320 is adapted to be locked. The second C-shaped slot 132b is adapted to hold the second connection bar 320.

Figure 7:
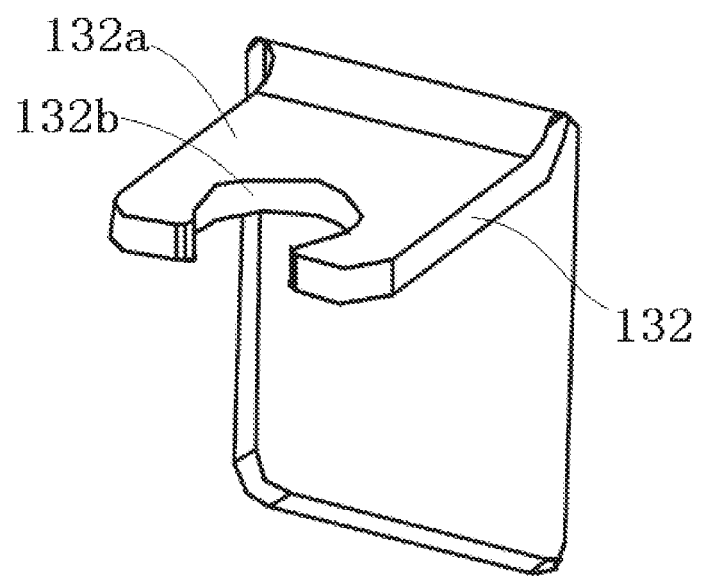
FIG. 7 is a perspective view of a second clasp of the connector.
Figure 8:
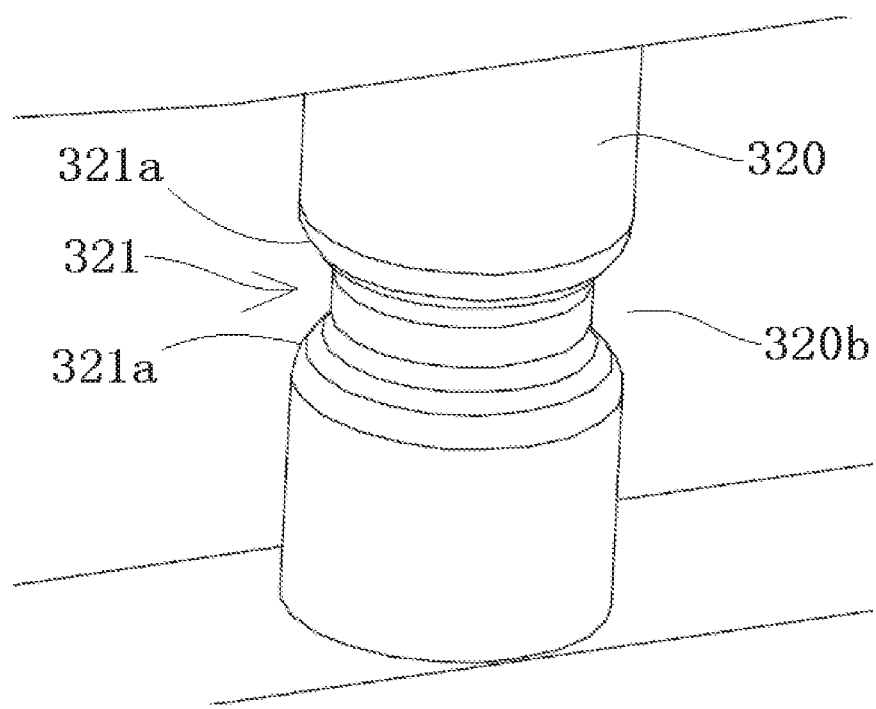
FIG. 8 is a perspective view of a second connection bar of the connector.

As shown in FIGS. 7 and 8, a circular second groove 321 is formed on the second connection bar 320 to form a second neck 320b on the second connection bar 320. The second neck 320b is adapted to be locked into the second C-shaped slot 132b. The second C-shaped slot 132b is adapted to hold the second neck 320b. The second groove 321 has a cross section with a horn shape gradually expanding outwards, two slope side surfaces 321a of the second groove 321 are mated with two inner side edges of the second C-shaped slot 132b to guide the second neck 320b into the second C-shaped slot 132b and position the second neck 320b in the second C-shaped slot 132b. The second clasp 132 has a second plate body 132a located in a horizontal plane perpendicular to the outer surface of the side wall 130, and the second C-shaped slot 132b is formed in the second plate body 132a.

In an embodiment, the first clasp 131 and the second clasp 132 are formed by punching the side wall 130 of the cage 100.

The locking structure, as shown in FIG. 4, comprises a third connection bar 330 provided between any two adjacent light pipes 300. The third connection bar 330 extends in the horizontal direction or the vertical direction and connects the two adjacent light pipes 300. In an embodiment, the plurality of light tubes 300, the first connection bar 310, the second connection bar 320, and the third connection bar 310 may be integrally molded in a single piece of a transparent material.

Figure 3:
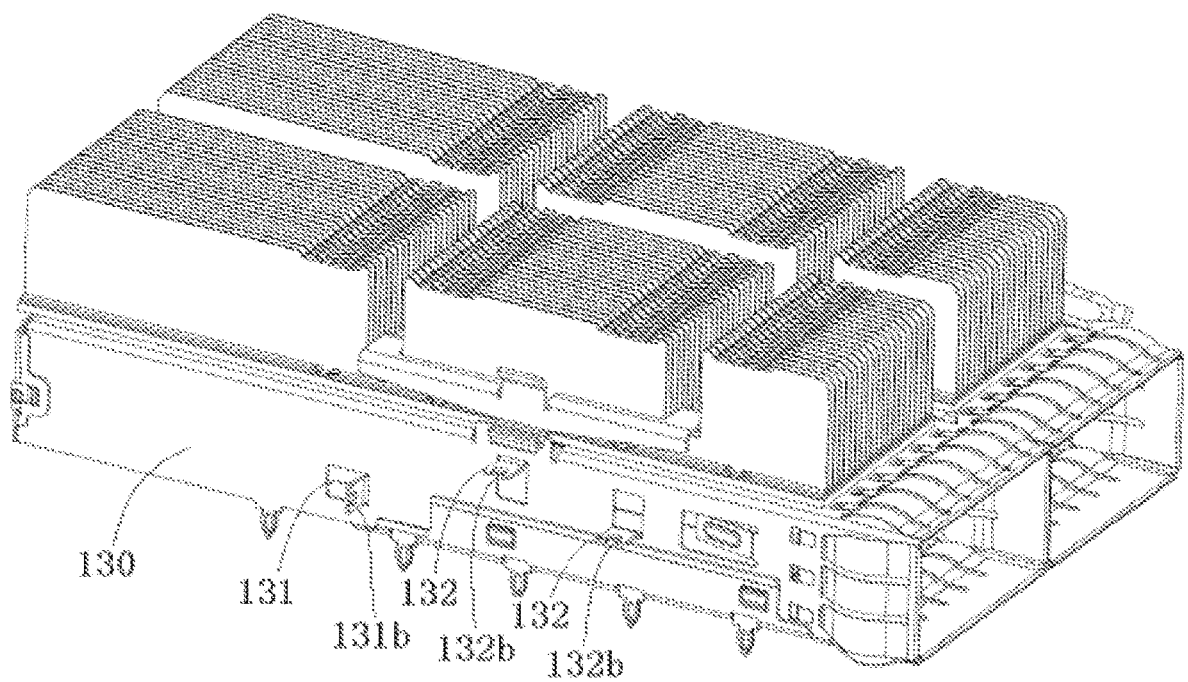
FIG. 3 is a perspective view of the connector without a light pipe.

In the embodiment shown in FIGS. 1, 3, and 4, the locking structure may comprise at least one first locking structure 310, 131 and at least two second locking structures 320, 132. In another embodiment, the locking structure may comprise at least two first locking structures 310, 131 and at least one second locking structure 320, 132.

As shown in FIGS. 1 and 4, each light pipe 300 has a light input surface 301 facing a circuit board (not shown) at the bottom of the cage 100, and a light output surface 302 facing an user in front of the cage 100, so as to transmit a light from an indicator mounted on the circuit board to the user's eyes.

The plurality of light pipes 300, as shown in the embodiment of FIGS. 1 and 4, have different light guide paths. The light guide path of the upper one of two adjacent light pipes 300 on each side wall 130 has a bending radius larger than that of the light guide path of the lower one of the two adjacent light pipes 300. As clearly shown in FIGS. 1 and 4, the uppermost light pipe 300 has the longest light guide path and the largest bending radius. The lowermost light pipe 300 has the shortest light guide path and the smallest bending radius. The plurality of light pipes 300 on each side wall 130 may be designed to have consistent light conduction intensity, for example, by optimizing the turning size and the turning angle of each light guide tube 300.

As shown in FIG. 1, the cage 100 may have a plurality of insertion chambers 101, and an elastic shielding member 400 may be mounted on four walls of a port of each insertion chamber 101. A plurality of pins 140 are formed on the bottom of the cage 100. The plurality of pins 140 are adapted to be inserted into holes formed in a circuit board, so as to fix the cage 100 on the circuit board.

What is claimed is:

1. A connector, comprising:
a cage having a top wall, a bottom wall, and a pair of side walls between the top wall and the bottom wall; and
a plurality of light pipes arranged in sequence and separated from each other, the plurality of light pipes fixed to an outer surface of at least one of the pair of side walls by a locking structure formed on the at least one side wall and the plurality of light pipes, the locking structure including:
a first locking structure configured to position and fix the plurality of light pipes in a first direction and including a first connection bar connecting adjacent light pipes of the plurality of light pipes, and a first clasp adapted to receive the first connection bar for securing the first connection bar thereto; and
a second locking structure configured to position and fix the plurality of light pipes in a second direction distinct from the first direction and including a second connection bar connecting adjacent light pipes of the plurality of light pipes, and a second clasp adapted to receive the second connection bar for securing the second connection bar thereto.

2. The connector of claim 1, further comprising a radiator mounted on the top wall of the cage.

3. The connector of claim 1, wherein the plurality of light pipes are arranged in sequence in a vertical plane.

4. The connector of claim 3, wherein the first locking structure is configured to position and fix the plurality of light pipes in a vertical direction and the second locking structure configured to position and fix the plurality of light pipes in a horizontal direction.

5. The connector of claim 4, wherein the first connection bar extends in the horizontal direction and the first clasp comprises a first C-shaped slot into which the first connection bar is adapted to be locked.

6. The connector of claim 5, wherein the second connection bar extends in the vertical direction and the second clasp comprises a second C-shaped slot into which the second connection bar is adapted to be locked.

7. The connector of claim 6, wherein a first groove is formed on the first connection bar to form a first neck on the first connection bar, the first neck is adapted to be locked into the first C-shaped slot.

8. The connector of claim 7, wherein the first groove has a cross section with a horn shape gradually expanding outwards, a pair of slope side surfaces of the first groove are mated with a pair of inner side edges of the first C-shaped slot to guide the first neck into the first C-shaped slot and position the first neck in the first C-shaped slot.

9. The connector of claim 7, wherein a second groove is formed on the second connection bar to form a second neck on the second connection bar, the second neck is adapted to be locked into the second C-shaped slot.

10. The connector of claim 9, wherein the second groove has a cross section with a horn shape gradually expanding outwards, a pair of slope side surfaces of the second groove are mated with a pair of inner side edges of the second C-shaped slot to guide the second neck into the second C-shaped slot and position the second neck in the second C-shaped slot.

11. The connector of claim 6, wherein the first clasp has a first plate body located in a plane perpendicular to the outer surface of the at least one side wall, the first C-shaped slot is formed in the first plate body, and the second clasp has a second plate body located in a horizontal plane perpendicular to the outer surface of the at least one side wall, the second C-shaped slot is formed in the second plate body.

12. The connector according to claim 11, wherein the first clasp and the second clasp are formed by punching the at least one side wall of the cage.

13. The connector according to claim 6, further comprising a third connection bar disposed between any pair of adjacent light pipes, the third connection bar extending in the horizontal direction or the vertical direction and connecting the pair of adjacent light pipes.

14. The connector of claim 13, wherein the plurality of light tubes, the first connection bar, the second connection bar, and the third connection bar are integrally molded in a single piece of a transparent material.

15. The connector of claim 4, wherein the locking structure includes a first locking structure and a pair of second locking structures, or the locking structure includes a pair of first locking structure and a second locking structure.

16. The connector of claim 3, wherein each light pipe has a light input surface facing a circuit board at the bottom of the cage and a light output surface facing a user in front of the cage to transmit a light from an indicator mounted on the circuit board to the user.

17. The connector of claim 16, wherein the plurality of light pipes on the at least one side wall each have a different light guide path and each have a consistent light conduction intensity.

18. The connector of claim 16, wherein the light guide path of an uppermost light pipe of the plurality of light pipes on the at least one side wall has a bending radius larger than a bending radius of the light guide path of a lowermost light pipe of the plurality of light pipes on the at least one side wall.

19. A connector, comprising:
a cage having a top wall, a bottom wall, and a pair of side walls between the top wall and the bottom wall;
a light pipe adapted to be fixed on at least one side wall of the pair of side walls; and
a locking structure formed on an outer surface of the at least one of the pair of side walls, the locking structure including:
a first connection bar extending from the light pipe and having a first groove formed therein to define a first neck on the connection bar; and
a first clasp adapted to receive the first neck of the first connection bar for securing the first connection bar thereto.

20. A connector, comprising:
a cage having a top wall, a bottom wall, and a pair of side walls between the top wall and the bottom wall; and
a plurality of light pipes mounted on an outer surface of each of the pair of side walls, the plurality of light pipes on each side wall are arranged in sequence in a vertical plane and separated from each other, and a pair of adjacent light pipes on each side wall are connected to each other, the light pipes are fixed to the outer surface of each of the pair of side walls by a locking structure formed on each of the side walls, the locking structure including:
a first locking structure configured to position and fix the plurality of light pipes in a vertical direction and including a first connection bar extending in the horizontal direction and connecting the pair of adjacent light pipes and a first clasp having a first C-shaped slot into which the first connection bar is adapted to be locked; and
a second locking structure configured to position and fix the plurality of light pipes in a horizontal direction and including a second connection bar extending in the vertical direction and connecting the pair of adjacent light pipes and a second clasp having a second C-shaped slot into which the second connection bar is adapted to be locked.

* * * * *